(12) United States Patent
Abhishek

(10) Patent No.: US 10,846,491 B1
(45) Date of Patent: Nov. 24, 2020

(54) ACOUSTIC TAG FOR PRODUCT INFORMATION DISPLAY AND A SYSTEM AND METHOD FOR READING AN ACOUSTIC TAG

(71) Applicant: NAFFA INNOVATIONS PRIVATE LIMITED, Bengaluru (IN)

(72) Inventor: Kumar Abhishek, Bengaluru (IN)

(73) Assignee: NAFFA INNOVATIONS PRIVATE LIMITED, Bengaluru (IN)

(*) Notice: Subject to any disclaimer, the term of this patent is extended or adjusted under 35 U.S.C. 154(b) by 11 days.

(21) Appl. No.: 16/532,456

(22) Filed: Aug. 5, 2019

(30) Foreign Application Priority Data

May 15, 2019 (IN) .............................. 201941019279

(51) Int. Cl.
*G06K 7/00* (2006.01)
*G06K 7/01* (2006.01)
*G06K 19/077* (2006.01)
*G10K 15/04* (2006.01)

(52) U.S. Cl.
CPC .......... *G06K 7/01* (2013.01); *G06K 19/07711* (2013.01); *G10K 15/04* (2013.01)

(58) Field of Classification Search
CPC ..... G06K 7/10; G06K 19/07711; G10Q 15/04
USPC ......................................................... 235/439
See application file for complete search history.

(56) References Cited

U.S. PATENT DOCUMENTS

| 5,714,997 A | * | 2/1998 | Anderson | G02B 27/017 348/39 |
| 2015/0317684 A1 | * | 11/2015 | Abir | G06K 7/02 705/14.64 |

* cited by examiner

*Primary Examiner* — Karl D Frech
(74) *Attorney, Agent, or Firm* — Barry Choobin; Patent 360 LLC

(57) ABSTRACT

The embodiments herein provide an audio information label/acoustic tag for delivering product information and system and method for reading an audio information label/acoustic tag. Accordingly, an acoustic tag system comprising an acoustic tag associated with an object is disclosed. The acoustic tag comprises an acoustic reflector surface configured for generating a characteristic acoustic signal in response to receiving a trigger in the form of an ambient sound wave and wherein the characteristic acoustic signal is an encoded form of information relating to the object associated with the acoustic tag and a decoding application installed on a user device, the decoding application configured for receiving the characteristic acoustic signal, decoding the characteristic acoustic signal in order to obtain the information embedded within the characteristic acoustic signal and displaying the information so obtained.

7 Claims, 3 Drawing Sheets

ACOUSTIC TAG FOR PRODUCT INFORMATION DISPLAY AND A SYSTEM AND METHOD FOR READING AN ACOUSTIC TAG

CROSS-REFERENCE TO RELATED APPLICATIONS

The embodiments herein claim the priority of the Indian Non-Provisional Patent Application No. 201941019279 titled "ACOUSTIC TAG FOR PRODUCT INFORMATION DISPLAY AND A SYSTEM AND METHOD FOR READING AN ACOUSTIC TAG", filed on May 15, 2019 and the contents of which are incorporated in entirety by the way of reference.

BACKGROUND

Technical Field

The embodiments herein are generally related to goods or products information labelling and management systems. The embodiments herein are particularly related to a system and method for displaying and retrieving product or goods detail through tags. The embodiments herein are more particularly related to an acoustic tag for retrieving, displaying and providing product or goods information to a user through audio technology by reading acoustic tag for product information.

Description of Related Art

Electronic labelling systems are known in which the electronic labels are placed on goods and shelves, in grocery stores, to serve as price tags. The information displayed on the labels is updated from a central unit communicating with the labels through wired or wireless communication systems.

However, all such electronic shelf labels require a portable power supply unit, such as battery, for powering various components. Therefore the usage of such labels in large numbers is not environmentally sustainable. Hence, there exists a need for an information label that eliminates a need for energy harvesting or storage.

Hence there is a need for a system and method for providing for providing product or goods detail/information to a user through audio technology. Further there is a need for an acoustic tag for retrieving and displaying product or goods information to provide the goods/product information to the user by reading the audio tag. Yet there is a need for a system and method for providing product or goods detail/information to a user through audio technology without requiring a power supply source.

The above-mentioned shortcomings, disadvantages and problems are addressed herein, which will be understood by reading and studying the following specification.

OBJECTIVES OF THE EMBODIMENTS HEREIN

The primary object of the embodiments herein is to provide a system and method for displaying product information electronically through audio technology.

Another object of the embodiments herein is to provide an audio labelling system for products or goods for retrieving and displaying product information in goods shelf in departmental stores without requiring a battery power or energy harvesting.

Yet another object of the embodiments herein is to provide an audio electronic label/acoustic tag that generates characteristic acoustic signal to identify an associated product.

Yet another object of the embodiments herein is to provide an audio electronic label/acoustic tag that employs ambient sound wave for generating acoustic signal.

Yet another object of the embodiments herein is to provide an audio acoustic tag for displaying and retrieving product or goods information.

Yet another object of the embodiments herein is to provide a system and method for reading acoustic tag for providing product information to a user.

Yet another object of the embodiments herein is to provide a seamless shopping experience for the user.

These and other objects and advantages of the embodiments herein will become readily apparent from the following detailed description taken in conjunction with the accompanying drawings.

SUMMARY

The various embodiments herein provide an Audio Electronic Labelling System (AESL) that is communicatively coupled to multiple AESLs for not only displaying information related to an associated product but also facilitating an addition and/or deletion of the product associated with the AESL into the virtual can of the user.

The embodiments herein provide an audio information label/acoustic tag associated with an object. The audio information label/acoustic tag comprises an acoustic reflector surface configured for generating a characteristic acoustic signal in response to a trigger signal received in a form of an ambient sound wave and wherein the characteristic acoustic signal is an encoded form of information relating to an object associated with the audio information label.

According to one embodiment herein, an audio information labelling system is provided. The system comprises an audio information label/acoustic tag associated with an object and affixed to the object. The audio information label/acoustic tag comprises an acoustic reflector surface configured for generating a characteristic acoustic signal in response to a trigger signal received in a form of an ambient sound wave and wherein the characteristic acoustic signal is an encoded form of information relating to the object associated and affixed with the audio information label. A decoding application is installed on a user computing device. The decoding application is configured for receiving the characteristic acoustic signal and decoding the characteristic acoustic signal to obtain or retrieve the information embedded within the characteristic acoustic signal and displaying the obtained/retrieved information.

According to one embodiment herein, a method for reading information contained in an audio information label/acoustic tag is provided. The method comprising the steps of imprinting an audio information label/acoustic tag comprising an acoustic reflector surface configured for generating a characteristic acoustic signal in response to a trigger signal received in a form of an ambient sound wave from a user computing device, and wherein the characteristic acoustic signal is an encoded form of information related to the object associated with the audio information label/acoustic tag; arranging for an ambient sound wave to be incident on the audio information label/acoustic tag; receiving a characteristic acoustic signal reflected by the audio information label/acoustic tag in response to the incident ambient sound wave; decoding the characteristic acoustic signal to obtain the information encoded within the characteristic acoustic signal and displaying the information so obtained.

These and other aspects will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
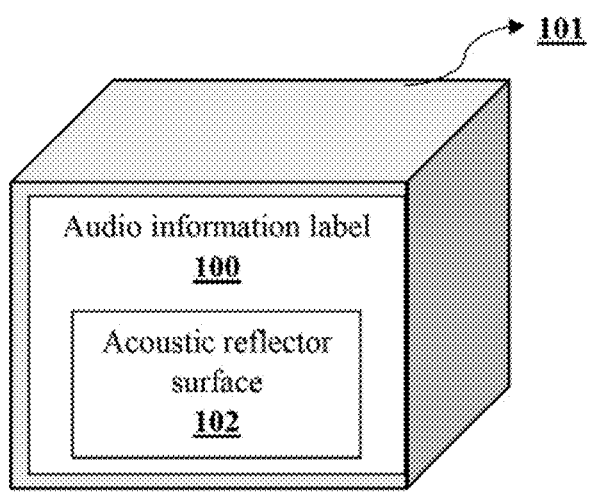
FIG. 1 illustrates a product affixed with an audio information label/acoustic tag, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide an Audio Electronic Labelling System (AESL) that is communicatively coupled to multiple AESLs for not only displaying information related to an associated product but also facilitating an addition and/or deletion of the product associated with the AESL into the virtual cart of the user.

The embodiments herein provide an audio information label/acoustic tag associated with an object. The audio information label/acoustic tag comprises an acoustic reflector surface configured for generating a characteristic acoustic signal in response to a trigger signal received in a form of an ambient sound wave and wherein the characteristic acoustic signal is an encoded form of information relating to an object associated with the audio information label/acoustic tag.

According to one embodiment herein, an audio information labelling system is provided. The system comprises an audio information label/acoustic tag associated with an object and affixed to the object. The audio information label/acoustic tag comprises an acoustic reflector surface configured for generating a characteristic acoustic signal in response to a trigger signal received in a form of an ambient sound wave and wherein the characteristic acoustic signal is an encoded form of information relating to the object associated and affixed with the audio information label/acoustic tag. A decoding application is installed on a user computing device. The decoding application is configured for receiving the characteristic acoustic signal and decoding the characteristic acoustic signal to obtain or retrieve the information embedded within the characteristic acoustic signal and displaying the obtained/retrieved information.

According to one embodiment herein, a method for reading information contained in an audio information label/acoustic tag is provided. The method comprising the steps of imprinting an audio information label comprising an acoustic reflector surface configured for generating a characteristic acoustic signal in response to a trigger signal received in a form of an ambient sound wave from a user computing device, and wherein the characteristic acoustic signal is an encoded form of information related to the object associated with the audio information label/acoustic tag; arranging for an ambient sound wave to be incident on the audio information label/acoustic tag; receiving a characteristic acoustic signal reflected by the audio information label/acoustic tag in response to the incident ambient sound wave; decoding the characteristic acoustic signal to obtain the information encoded within the characteristic acoustic signal and displaying the information so obtained.

According to one embodiment herein, a hand held device is required to the receive, record and display the information received from the reflector surface when a sound burst is incident or directed towards the reflector surface in the acoustic tag. scan a machine-readable barcode that is pasted on an item/product. Whereas in case of Acoustic tag, a sound burst is sent to make each acoustic tag to reflect the embedded information from respective items/product thereby simplifying the information capture process and eliminating a need for manual intervention with each item barcode.

According to one embodiment herein, any source of sound in audible/non-audible range is a form of ambient energy is used to trigger or incident on the acoustic tag to reflect the information.

According to one embodiment herein, the hand held electronic device comprises an application. According to one embodiment herein, the hand held electronic device is a mobile phone (with inbuilt mic) with an application having the capability of recording and showing the product information.

FIG. 1 illustrates a product affixed with an audio information label/acoustic tag, according to one embodiment herein. With respect to FIG. 1, an audio information label/acoustic tag 100 associated with an object 101 is provided. The audio information label/acoustic tag 100 is configured for providing object 101 related information that includes identity information, price information or information related to the product, to the user device 202 (shown in FIG. 2).

The audio information label/acoustic tag 100 (like a barcode) is attached to an object 101 or a product (for example: garment) and carries information of the associated object 101. The information that is embedded into the audio information label 100 is shared through a medium of sound. The ambient sound energy surrounding the audio information label/acoustic tag 100 functions as a trigger point for the audio information label 100 to reflect the embedded information in response to an incident sound energy.

The response is in a form of sound and any user device 202 equipped with a capability of listening this response sound is configured to display or provide the details of the product.

The audio information label/acoustic tag 100 comprises an acoustic reflector surface 102 configured for generating a characteristic acoustic signal in response to a trigger signal received in a form of an ambient sound wave and wherein the characteristic acoustic signal is an encoded form of information related to the object 101 associated with the audio information label 100.

The audio information label/acoustic tag 100 includes an acoustic reflective surface 102 which reflects sound waves in a pattern that uniquely identifies the tag (similar in principle to barcode which uses light). The incident sound waves is an ambient sound or a directed sound wave (support both audible and non-audible sound waves) Any Source of sound in audible/non-audible range is configured to emit a trigger sound to incident on the audio information label 100 to reflect the information.

The audio information label/acoustic tag 100 reflects the incident sound into a unique pattern with high efficiency or amplifies the incident sound such that the reflected pattern is recognized at-least at a distance of about one meter.

A user device 202 is required to scan a machine-readable barcode that is pasted on an item/product. In case of the audio information label 100, a sound burst is sent to make the audio information label/acoustic tag 100 to reflect the embedded information from respective items/product/object 101. Hence information is captured easily and there is no need for a manual intervention with each item barcode.

This capability is used for providing a better customer shopping experience, Inventory management and stock calculation and verification.

According to one embodiment herein, the acoustic reflector surface 102 is in a form of ink or sticker that is easily printed or distributed. Acoustic reflector surface 102s are well known in the art and therefore not described in detail.

According to one embodiment herein, the audio information label/acoustic tag 100 is a printed electronic circuit that is physically coupled to the object 101. The label is tagged, secured or attached to the object 101. Alternatively, the audio information label 100 is imprinted on the object 101.

Figure 2:
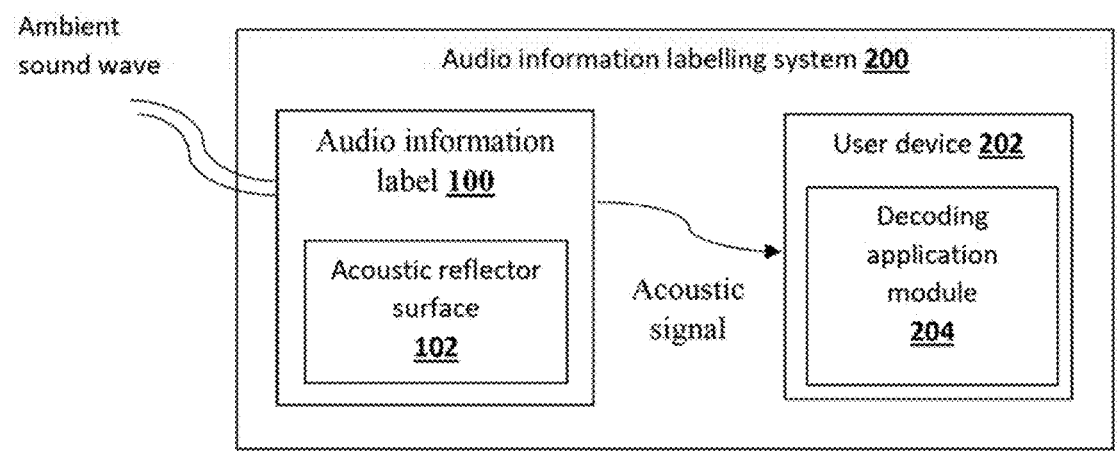
FIG. 2 illustrates a block diagram of an audio information labelling system, according to one embodiment herein.

FIG. 2 illustrates a block diagram of an audio information labelling system, according to one embodiment herein. With respect to FIG. 2, an audio information labelling system 200 is disclosed. The audio information labelling system 200 comprises an audio information label/acoustic tag 100 associated with an object 101 (described in conjunction with FIG. 1) and a decoding application installed on a user device 202. The decoding application is configured for receiving the characteristic acoustic signal, to decode the characteristic acoustic signal to obtain the information embedded within the characteristic acoustic signal and display the information thus obtained.

According to one embodiment herein, the decoding application module 204 is installed on any user device 202 having recording capability. A support installation of application to display the recorded information is installed on a user device 202. The user device 202 is a personal computing device, such as, a desktop computer, a laptop computer, a notebook, a netbook, a tablet personal computer (PC), a control panel, a smart phone, a mobile phone, a personal digital assistant (PDA), and/or any other suitable device operable to send and receive data and display data.

The user device 202, comprises an audio receiver (such as a microphone), a display unit (such as a Liquid Crystal Display or a touch screen display), an encoder unit, decoder unit and a buzzer application/module/device. The encoder unit is configured for encoding the information of the object 101 associated with the audio information label 100 for generating the acoustic signal. The decoder unit is configured for decoding the information from the characteristic acoustic signal for recovering the product/object 101 related information. The buzzer application is configured for generating an ambient signal for triggering the acoustic label and the trigger signal is made to or directed to be incident on the reflector surface of the acoustic label.

According to an embodiment herein, the characteristic acoustic signal is generated using an audio tag library and therefore is decoded using the audio tag library. Encoding and decoding techniques employed herein include AES, DES and RSA among other things.

Figure 3:
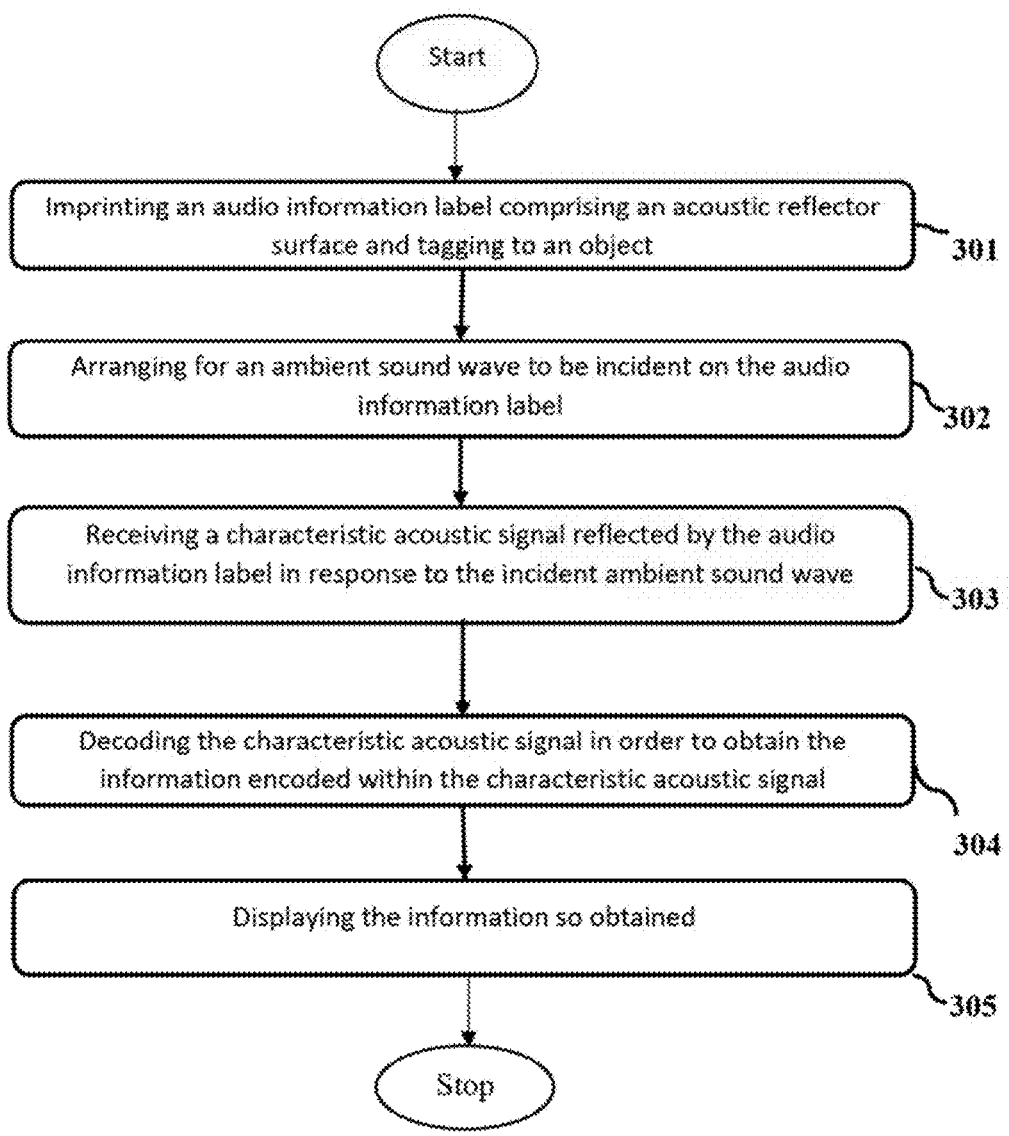
FIG. 3 illustrates a flow chart explaining a method of reading information contained in an audio information label/acoustic tag, according to one embodiment herein.

FIG. 3 illustrates a flow chart explaining a method of reading information contained in an audio information label, according to one embodiment of herein. With respect to FIG. 3, a method of reading information contained in an audio information label is provided. The method comprising steps of imprinting an audio information label with an acoustic reflector surface and tagging the audio information label to an object (301); arranging for an ambient sound wave to be incident on the audio information label (302); receiving a characteristic acoustic signal reflected by the audio information label in response to the incident ambient sound wave (303); decoding the characteristic acoustic signal to obtain the information encoded within the characteristic acoustic signal (304); and displaying the information so obtained on a user computing device (305).

According to an embodiment herein, a user device is loaded with a buzzer application. The buzzer application is configured to generate a burst of acoustic signals/sound-waves to be incident on the reflector surface of the acoustic tag to release the encoded information as sound waves. The user device is configured to capture the emitted sound waves and decode the information to retrieve and provide a product information to the user. The decoding application is also installed in the user device. The decoding application may be downloaded from the central server and installed on the user device. The retrieved information is displayed to the user through a user interface.

The method 300 disclosed herein is programmed into a computer readable media. Computer-readable media includes both computer storage media and communication media including any medium that facilitates transfer of a computer program from one place to another. A storage medium is any available medium that is accessed by a general purpose or special purpose computer. By way of example, and not limitation, computer-readable media comprise RAM, ROM, EEPROM, flash memory, CD-ROM, DVD, or other optical disk storage, magnetic disk storage or other magnetic storage devices, or any other medium that is used to carry or store desired program code means in the form of instructions or data structures and that is accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Further, the method 300 is incorporated as a web application or a mobile application that is installed in a user device 202.

Applications, as used herein, include any set of computing instructions. Applications instruct an electronic device to perform specified functions. Applications typically contain logic and methods for accessing, manipulating, and storing data. Examples of applications include word processors, web browsers, email clients, games (e.g., chess games, etc), and media players. Applications contain instructions on displaying and formatting data. For example, an application is configured to instruct an electronic device to access certain data and display it in a specified format and/or at a specified time.

Applications are transported via any method suitable for such purpose. For example, the applications are downloaded to the user device 202 via a Web browser or transported to the user device 202 using a "push" type operation via a network protocol over a cable or wireless infrastructure. Possible means for pushing an application or application reference include, but are not limited to, email, embedding in a Web page, part of an RSS feed, a WAP™ push, or a Bluetooth™ transmission. The system for deploying applications to the user device 202s optionally include a runtime environment for the application. A runtime environment is software that allows a user device 202 to execute application code.

In addition, the embodiments herein are implemented by hardware, software, firmware, middleware, microcode, or any combination thereof. When implemented in software, firmware, middleware or microcode, the program code or code segments required to perform the necessary tasks is stored in a machine readable medium such as storage medium or in a separate storage(s) not shown. A processor is configured to perform the necessary tasks. A code segment is configured to represent a procedure, a function, a subprogram, a program, a routine, a subroutine, a module, a software package, a class, or any combination of instructions, data structures, or program statements. A code segment is coupled to another code segment or a hardware circuit by passing and/or receiving information, data, arguments, parameters, or memory contents. Information, arguments, parameters, data, etc. are passed, forwarded, or transmitted via any suitable means including memory sharing, message passing, token passing, network transmission, etc.

The embodiments herein provide one or more of the following advantages. Usage of ambient sound energy from the surrounding without having to use any battery or energy harvesting. Unique pattern emitted/reflected from the audio information label to identify any given product.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. An audio information label associated with an object, the audio information label comprising:
    an acoustic reflector surface configured for generating a characteristic acoustic signal in response to a trigger signal received in a form of an ambient sound wave from a user device and wherein the characteristic acoustic signal is an encoded form of information related to the object associated with the audio information label, and wherein the acoustic reflector surface is imprinted on a substrate, and wherein the substrate with the acoustic reflector surface is secured around the object, and wherein the characteristic acoustic signal is generated using an audio tag library, and wherein the characteristic acoustic signal is decoded using the audio tag library, and wherein the user device is any one of a computing device or a portable computing device or mobile phone, and wherein the user device is configured to decode the characteristic acoustic signal to obtain/retrieve the information embedded within the characteristic acoustic signal, and to display the retrieved information of the goods.

2. The audio information label according to claim 1, wherein the substrate is affixed to attached or tagged on an object or goods.

3. An audio information labelling system comprising:
    an audio information label associated with an object, and wherein the audio information label comprises an acoustic reflector surface configured for generating a characteristic acoustic signal in response to a receipt of a trigger in a form of an ambient sound wave and wherein the characteristic acoustic signal is an encoded form of information related to the object associated with the audio information label; and
    a user device installed with a decoding application module, and wherein the decoding application module is configured for receiving the characteristic acoustic signal, and wherein the decoding application is configured to decode the characteristic acoustic signal to obtain/retrieve the information embedded within the characteristic acoustic signal; and
    a user interface provided in the user device for displaying the retrieved information of the goods;
    wherein the user device is any one of a computing device or a portable computing device or mobile phone.

4. The audio information labelling system according to claim 3, wherein the characteristic acoustic signal is generated using an audio tag library, and wherein the audio tag library is stored in a central server, and wherein the central server is connected to the acoustic label in a wired or wireless manner.

5. The audio information labelling system according to claim 3, wherein the characteristic acoustic signal is decoded using the audio tag library, and wherein the user device is communicatively coupled to the central server to access the audio tag library.

6. The audio information labelling system according to claim 3, wherein the acoustic reflector surface is imprinted on a substrate, and wherein the substrate is affixed or attached or tagged on an object or goods or secured around the object.

7. A method of reading information contained in an audio information label, the method comprising steps of:
- imprinting an audio information label comprising an acoustic reflector surface configured for generating a characteristic acoustic signal upon receiving a trigger in a form of an ambient sound wave and wherein the characteristic acoustic signal is an encoded form of information related to an object/goods associated with the audio information label;
- generating an ambient sound wave to be incident on the audio information label through a user device;
- receiving a characteristic acoustic signal reflected by the audio information label in response to the incident ambient sound wave;
- decoding the characteristic acoustic signal in order to obtain the information encoded within the characteristic acoustic signal; and
- displaying the information so obtained.

\* \* \* \* \*